(12) United States Patent
Itami

(10) Patent No.: US 8,752,602 B2
(45) Date of Patent: Jun. 17, 2014

(54) AIRCRAFT TIRE

(75) Inventor: Daisuke Itami, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 138 days.

(21) Appl. No.: 13/265,690

(22) PCT Filed: Apr. 22, 2010

(86) PCT No.: PCT/JP2010/002934
§ 371 (c)(1),
(2), (4) Date: Oct. 21, 2011

(87) PCT Pub. No.: WO2010/122803
PCT Pub. Date: Oct. 28, 2010

(65) Prior Publication Data
US 2012/0037290 A1    Feb. 16, 2012

(30) Foreign Application Priority Data
Apr. 22, 2009  (JP) .................. 2009-103816

(51) Int. Cl.
*B60C 9/02* (2006.01)
*B60C 9/13* (2006.01)

(52) U.S. Cl.
USPC .................... 152/548; 152/556; 152/557

(58) Field of Classification Search
None
See application file for complete search history.

(56) References Cited

U.S. PATENT DOCUMENTS

| | | | |
|---|---|---|---|
| 4,732,199 A | 3/1988 | Kajiwara | |
| 5,025,845 A * | 6/1991 | Iino et al. | 152/559 |
| 5,522,443 A | 6/1996 | Ueyoko et al. | |
| 7,484,545 B2 * | 2/2009 | Westgate et al. | 152/557 |
| 2004/0206439 A1 | 10/2004 | Roget et al. | |
| 2007/0137754 A1 | 6/2007 | Westgate et al. | |
| 2007/0235116 A1 | 10/2007 | Roget et al. | |

FOREIGN PATENT DOCUMENTS

| | | | |
|---|---|---|---|
| JP | 58-8405 | * | 1/1983 |
| JP | 61-268504 A | | 11/1986 |
| JP | 2-068207 A | | 3/1990 |
| JP | 2-141502 U | | 11/1990 |
| JP | 4-081301 A | | 3/1992 |
| JP | 6-008706 A | | 1/1994 |
| JP | 2004-523430 A | | 8/2004 |
| JP | 2009-083519 A | | 4/2009 |
| JP | 2009-119926 A | | 6/2009 |
| WO | 03/061991 A1 | | 7/2003 |

OTHER PUBLICATIONS

English translation of JP 58-8405, 1983.*
International Search Report for PCT/JP2010/002934 dated Aug. 3, 2010.

(Continued)

*Primary Examiner* — Justin Fischer
(74) *Attorney, Agent, or Firm* — Sughrue Mion, PLLC (57) ABSTRACT

The present invention provides an aircraft tire having a carcass structure capable of sufficiently satisfying recent demands for high pressure resistance without increase in tire weight. An aircraft tire 9 includes a pair of bead portions 2 and a carcass 4 made by stacking two or more carcass layers 3 composed of cords coated with rubber, which toroidally extend between the bead portions 2. Further, with respect to carcass layers 3 of the carcass 4 which are adjacent to each other, elongation at break of a widthwise outer carcass layer 3 is smaller than elongation at break of a widthwise inner carcass layer 3.

7 Claims, 4 Drawing Sheets

(internal pressure is applied)  (internal pressure is not applied)

(56) References Cited

OTHER PUBLICATIONS

Chinese Office Action, dated Jun. 20, 2013, issued in corresponding Chinese Patent Application No. 201080024128.1.

Chinese Office Action, dated Dec. 13, 2013, issued in corresponding Chinese Patent Application No. 201080024128.1.

Japanese Office Action issued in Japanese Application No. 2011-510231 dated Dec. 3, 2013.

* cited by examiner

AIRCRAFT TIRE

CROSS REFERENCE TO RELATED APPLICATIONS

This application is a National Stage of International Application No. PCT/JP2010/002934 filed on Apr. 22, 2010, which claims priority from Japanese Patent Application No. 2009-103816, filed Apr. 22, 2009, the contents of all of which are incorporated herein by reference in their entirety.

TECHNICAL FIELD

The present invention relates to an aircraft tire and more particularly to an aircraft tire which is intended to improve pressure resistance of the same.

RELATED ART

High-level safety has been demanded for aircraft tires and such tires are required to have pressure resistance for even four times the regular internal pressure.

In order to meet such demands, pressure resistance of aircraft tires is ensured with the use of a carcass as a framework; the carcass is formed by stacking two or more carcass layers composed of cords coated with rubber, which toroidally extend between a pair of bead portions.

As such an aircraft tire, WO2003/061991 proposes a tire including two or more carcass layers, the carcass layers having a tensile fracture strength of 6.3 cN/dtex or higher, an elongation percentage of 0.2% to 1.8% when 0.2 cN/dtex load is applied in an elongating direction, an elongation percentage of 1.4% to 6.4% when 1.9 cN/dtex load is applied in the elongating direction, and an elongation percentage of 2.1% to 8.6% when 2.9 cN/dtex load is applied in the elongating direction. Increase in the number of carcass layers is suppressed and the carcass layers are restrained from swelling in the widthwise direction of the tire accordingly.

However, in recent years, aircraft tires grow in size and are applied with higher internal pressure; therefore, it is not deniable that the tires with the structure of the above-mentioned technique lack strength. Thus, the number of carcass layers tends to be increased further than ever in order to restrain swelling in the tire width direction.

For example, when a new tire is developed with increase in the size of an aircraft tire, attempts have been made to increase the number of carcass layers having the same kind of cords in order to improve pressure resistance of the tire.

PRIOR ART DOCUMENT

[Patent Document 1] pamphlet of WO2003/061991

DISCLOSURE OF THE INVENTION

Problems to be Solved by the Invention

Thus increased number of carcass layers provides resistance commensurate with increase in the number of carcass layers. On the other hand, increase in tire weight has been a new problem.

It is, therefore, an object of the present invention to propose a carcass structure capable of sufficiently satisfying recent demands for high pressure resistance without increase in tire weight.

Means for Solving the Problem

The inventor made a detailed study to achieve the above-mentioned object and newly found that, when a tire having a carcass composed of two or more layers is applied with high internal pressure, a carcass layer disposed on the widthwise inner side is elongated differently from a carcass layer disposed on the widthwise outer side and the above-mentioned object can be achieved by reducing such difference. That is to say, when a tire is applied with a high internal pressure, rubber of carcass layers is elongated in the width directions of the tire due to radial and widthwise expansion of the tire and the rubber gauge between the carcass layers is decreased accordingly. In particular, in a carcass, a region from a shoulder portion to a bead portion which is not tied with a belt significantly expands widthwise. The inventor found out that at the time of such expansion, cords constituting each carcass layer are differently elongated and carcass layers which have been greatly elongated are fractured early and that the above-mentioned object can be achieved by remediating this phenomenon. Note that the "widthwise inner carcass layer" and the "widthwise outer carcass layer" are referred to carcass layers corresponding to a "radially inner carcass layer" and a "radially outer carcass layer" viewed on the tire equatorial plane, respectively.

Figure 1:
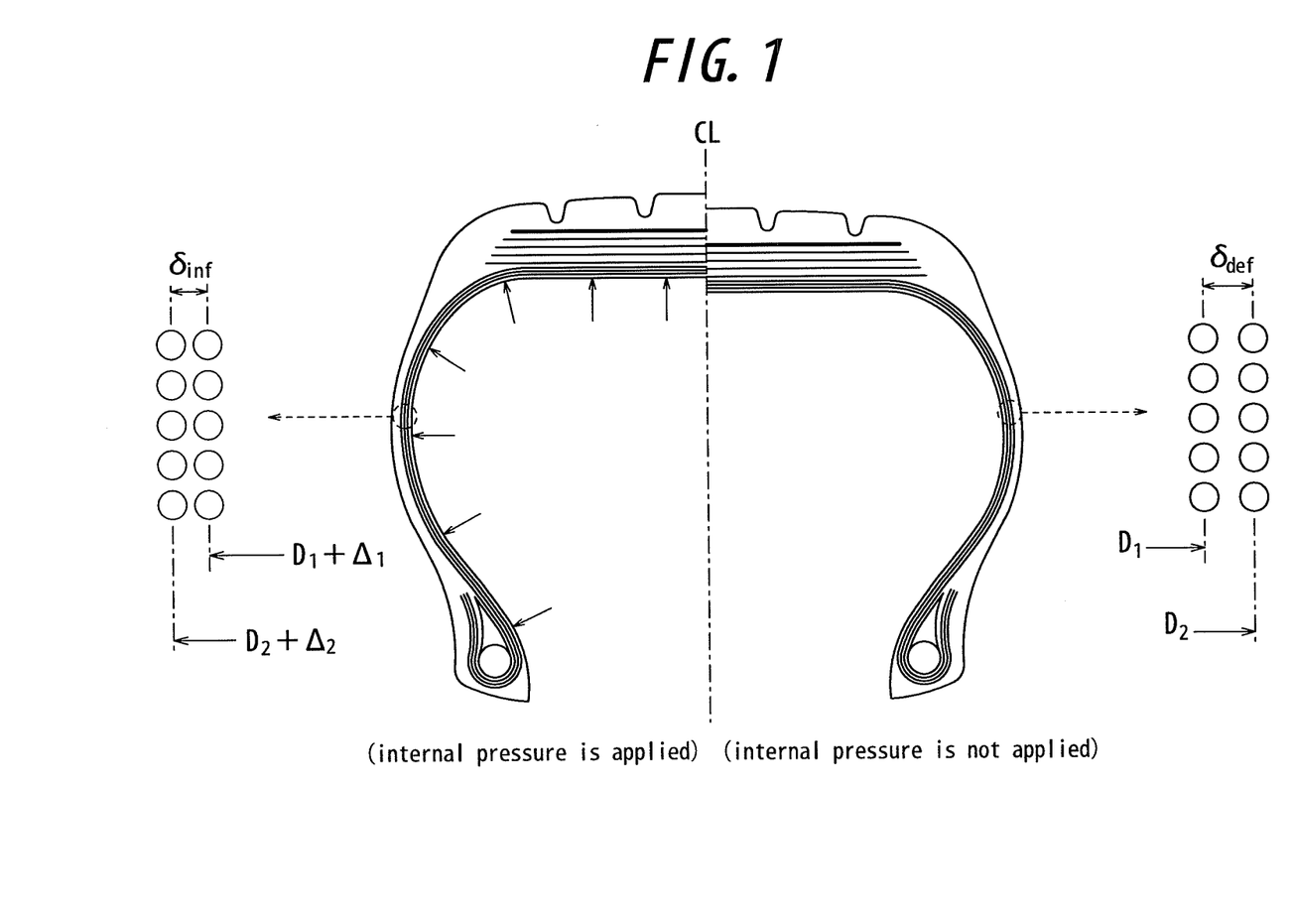
FIG. 1 is a view showing partially enlarged carcass layers before and after a tire is applied with an internal pressure.

The above-mentioned phenomenon will be further explained in detail with reference to the drawings. FIG. 1 is a view illustrating a tire before and after being applied with internal pressure, in which two carcass layers among the carcass layers of the tire are partially enlarged.

Assuming that, when the inside of a tire is not filled with air, the shortest distance from a tire equatorial plane to a line segment through the axis in the center of the carcass layer disposed on the widthwise inner side of the carcass, which is parallel to the tire equatorial plane is D1 and the shortest distance from the tire equatorial plane to a line segment through the axis in the center of the carcass layer disposed on the widthwise outer side of the carcass, which is parallel to the equatorial plane is D2, the above-mentioned shortest distances are D1+Δ1 and D2+Δ2, respectively when the inside of the tire is filled with air.

When the tire is applied with internal pressure, a distance between carcass layers, that is, spacing between arrayed cords of the carcass layers is reduced and a distance $\delta_{def}$ between cords when the tire is not applied with internal pressure and a distance $\delta_{def}$ between cords when the tire is applied with internal pressure in FIG. 1 satisfy the relationship $\delta_{def} > \delta_{inf}$.

The distance $\delta_{inf}$ between cords when the tire is applied with internal pressure is shorter than $\delta_{def}$ because the increases in the respective shortest distances are different, which results in Δ1>Δ2. As just described, Δ1 becomes larger than Δ2; thus, cords constituting the carcass layer disposed on the widthwise inner side are differently elongated from cords constituting the carcass layer disposed on the widthwise outer side. As a result, the carcass layers are differently elongated. Specifically, the carcass layer disposed on the widthwise inner side is more elongated.

Figure 2:
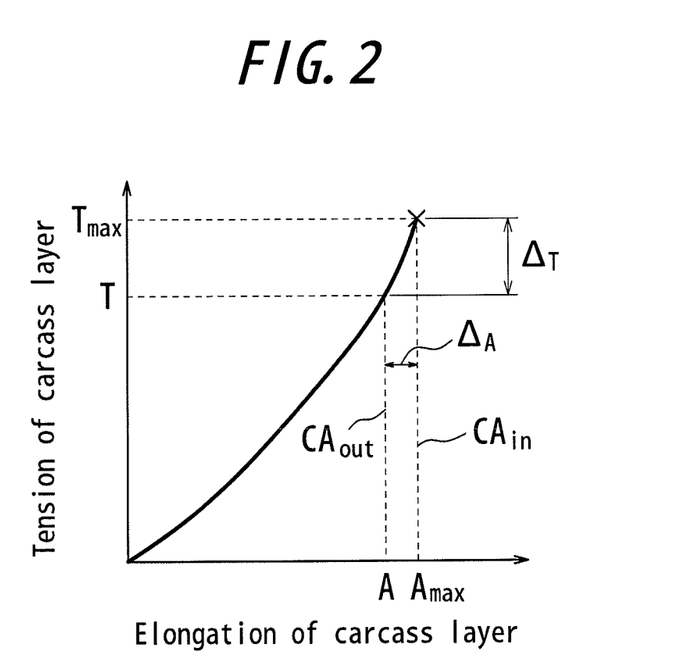
FIG. 2 is a view showing a relationship between tension and an elongation ratio of a carcass layer according to a conventional example.

FIG. 2 shows a relationship between tension and an elongation percentage of a conventional carcass layer at the timing when a tire is broken, that is, when any of the carcass layers constituting a carcass is broken. In the figure, $CA_{in}$ denotes a carcass layer disposed on the widthwise inner side and $CA_{out}$ denotes a carcass layer disposed on the widthwise outer side. Amax denotes an elongation pecentage when the carcass layer $CA_{in}$ is broken, namely elongation at break, and the tension at that time is Tmax. In addition, an elongation percentage of the carcass layer $CA_{out}$ when the carcass layer $CA_{in}$ is broken is A and the tension at that time is T.

As shown in FIG. 2, as two carcass layers having the same specifications are compared, when the tire is broken, the carcass layer $CA_{in}$ is broken due to a limit of cord strength while the carcass layer $CA_{out}$ does not reach a limit of cord strength. In other words, when the carcass layer $CA_{in}$ is broken, the carcass layer $CA_{out}$ can afford an extra elongation percentage and tension until the carcass layer $CA_{out}$ is broken (ΔA and ΔT represent an extra elongation percentage and tension in the figure). Thus, the tire is broken while the carcass layer $CA_{out}$ does not give the best performance. The above results show that the ability of the carcass layer $CA_{out}$ is not utilized to the maximum.

Therefore, based on the above-mentioned knowledge, the inventor studied a method for bringing out each carcass layer constituting a carcass to the maximum and obtaining desired pressure resistance without increasing tire weight, and consequently found that it is effective for improving pressure resistance without increasing tire weight to appropriately adjust elongation at break of each carcass layer constituting a carcass from the widthwise inner side to the outer side. The present invention is predicated on the above-mentioned knowledge.

The subject matter of the present invention is as follows.

(1) An aircraft tire includes a pair of bead portions and a carcass made by stacking two or more carcass layers composed of cords coated with rubber. The carcass layers toroidally extend between the bead portions. With respect to carcass layers of the carcass which are adjacent to each other, elongation at break of a widthwise outer carcass layer is smaller than elongation at break of a widthwise inner carcass layer.

(2) In the aircraft tire according to (1) above, elongation at break $L_{out}$ of a widthwise outermost carcass layer of the carcass and elongation at break $L_{in}$ of a widthwise innermost carcass layer satisfy $0.75 < L_{out}/L_{in} < 0.98$.

(3) In the aircraft tire according to (1) or (2) above, elongation at break $M_{in}$ of cords constituting the widthwise innermost carcass layer of the carcass and elongation at break $M_{out}$ of cords constituting the widthwise outermost carcass layer satisfy $0.75 < M_{out}/M_{in} < 0.98$.

(4) In the aircraft tire according to any one of (1) to (3) above, between two or more carcass layers composed of cords coated with rubber in the carcass, cords are stacked to intersect with each other. Further, with respect to adjacent carcass layers, an inclination angle of cords constituting a widthwise outer carcass layer with respect to a tire width direction is smaller than an inclination angle of cords constituting a widthwise inner carcass layer with respect to the tire width direction.

(5) The aircraft tire according to any one of (1) to (4) above, with respect to the adjacent carcass layers, twist turns of cords constituting the widthwise outer carcass layer is equal to or less than twist turns of cords constituting the widthwise inner carcass layer.

(6) In the aircraft tire according to any one of (1) to (5) above, the cords constituting the carcass layers are organic fiber cords.

(7) In the aircraft tire according to any one of (1) to (6) above, spacing distance between each of adjacent carcass layers in the carcass increases toward the widthwise outer side from the widthwise inner side.

(8) In the aircraft tire according to (7) above, the carcass layers are three or more carcass layers.

(9) The aircraft tire according to (7) or (8) above, the spacing distance between the adjacent carcass layers progressively increases toward the widthwise outer side from the widthwise inner side.

According to the present invention, in a carcass composed of at least two carcass layers having a plurality of cords coated with rubber, elongation at break of the widthwise outermost carcass layer is made smaller than elongation at break of a widthwise innermost carcass layer, and the percentage of elongation at break of the both of the carcass layers is adjusted, to bring out the ability of each carcass layer to the maximum. Thus, a carcass structure capable of sufficiently satisfying recent demands for high pressure resistance without increase in tire weight can be provided. As a result, an aircraft tire obtaining desired pressure resistance can be provided.

BEST MODE FOR CARRYING OUT THE INVENTION

Figure 3:
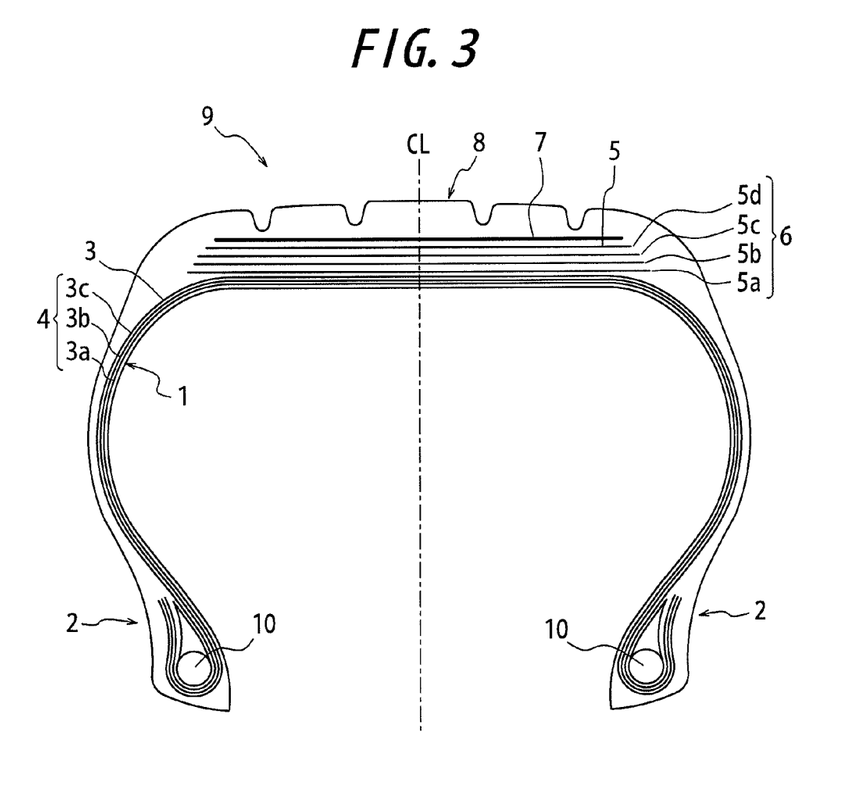
FIG. 3 is a view showing a widthwise section of an aircraft tire according to the present invention.

Hereinafter, the present invention will be specifically explained. FIG. 3 shows a widthwise sectional view of a pneumatic tire according to the present invention. The tire shown in FIG. 3 includes an inner liner 1, a pair of bead portions 2 which are engaged to rims when the tire is mounted on the rims, a carcass 4 composed of carcass layers 3 toroidally extending between the bead portions 2 (carcass layers 3a to 3c denote carcass layers of the carcass 4 which are sequentially stacked on the widthwise outer side of the inner liner 1). The tire further includes a belt 6 composed of belt layers 5 on the carcass 4 on the radially outer side of the tire (belt layers 5a to 5d denote layers of the belt 6 which are sequentially stacked on the carcass 4 on the radially outer side of the tire). Furthermore, the tire includes a belt protecting layer 7 on the belt 6 on the radially outer side, and a tread portion 8 disposed on even the radially outer side than the belt protecting layer 7. Reference numeral 9 denotes the whole tire.

The carcass 4 is made by stacking at least three layers of the carcass layers 3 composed of cords coated with rubber, three layers of the carcass layers 3a to 3c in the diagram. With respect to adjacent carcass layers, elongation at break of a widthwise outer carcass layer 3 is smaller than the elongation at break of a widthwise inner carcass layer 3. Specifically, elongation at break of the carcass layer 3b is smaller than the elongation at break of the carcass layer 3a, and elongation at break of the carcass layer 3c is smaller than the elongation at break of the carcass layer 3b.

Here, elongation at break of the carcass layers 3 means an elongation percentage at break L of the carcass layers 3 and can be calculated from elongation at break M [%] of cords constituting the carcass layers 3. Specifically, assuming that a is an inclination angle of cords with respect to the direction of the width of a tire, an elongation percentage at break L of the carcass layers 3 can be calculated from the following equation.

$$L = M \times \cos \alpha$$ [Equation 1]

Elongation at break M of cords is measured by the tensile test compliant with JIS L 1017.

Thus, elongation at break of the carcass layers 3 can be increased or decreased by changing at least one of elongation at break M of cords and an inclination angle α of cords.

Figure 4:
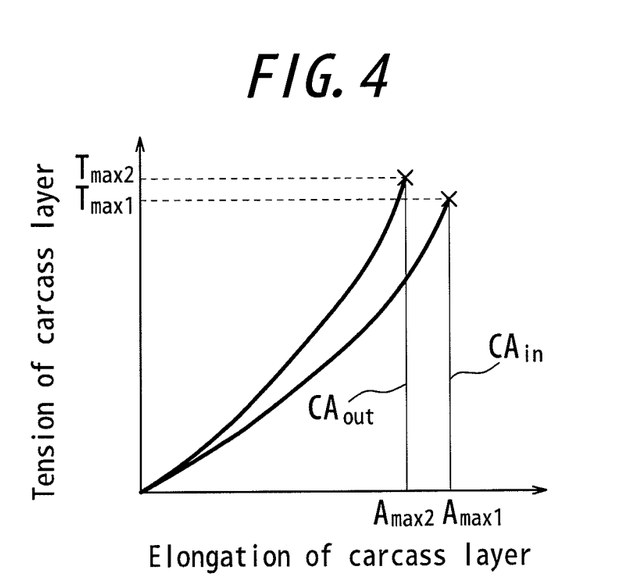
FIG. 4 is a view showing a relationship between tension and an elongation ratio of a carcass layer according to the present invention.

FIG. 4 shows a relationship between an elongation percentage and tension of the carcass layers 3 when the tire 9 having a carcass structure in which elongation at break of the carcass layers 3 is appropriately adjusted according to the present invention is broken. As shown in this figure, although the carcass layer $CA_{out}$ and the carcass layer $CA_{in}$ each have different limits of an elongation ratio and tension, it is found that the carcass layer $CA_{out}$ and the carcass layer $CA_{in}$ are broken at the same time when the tire 9 is broken. Specifically, since elongation at break $A_{max2}$ of the carcass layer $CA_{out}$ is made smaller than elongation at break $A_{max1}$ of the carcass layer elongation limit $A_{max1}$ of the carcass layer $CA_{in}$ applied with a higher pressure than the carcass layer $CA_{out}$ is larger than the elongation limit $A_{max2}$ of the carcass layer $CA_{out}$. Therefore, the carcass layer $CA_{in}$ is not broken earlier but can be broken in synchronization with the carcass layer $CA_{out}$ being broken. Therefore, the carcass layer $CA_{in}$ can afford a tension up to $T_{max1}$ and the carcass layer $CA_{out}$ can afford a tension up to $T_{max2}$ as well so that tension of the carcass layer $CA_{out}$, which cannot be conventionally used up can be used up.

As a result, each of the carcass layers 3a to 3c can be utilized to the maximum so that it is possible to improve pressure resistance without increasing the number of layers in the carcass 4.

It is noted that the carcass structure and the number of the stacked carcass layers 3 shown in the widthwise sectional view of the tire 9 in FIG. 3 are not limited in particular but can be appropriately adjusted as long as the advantageous effects of the present invention can be obtained. Further, the carcass 4 includes a carcass 4 having a bias structure and a carcass 4 having a radial structure. However, the carcass 4 having a radial structure generally has low durability in a region from sidewall portions to the bead portions; therefore, it should be noted that especially advantageous effects can be obtained by applying a structure according to the present invention to a tire including a carcass 4 having a radial structure.

Further, elongation at break $L_{out}$ of the widthwise outermost carcass layer 3 of the carcass 4 and elongation at break $L_{in}$ of the widthwise innermost carcass layer 3 preferably satisfy $0.75<L_{out}/L_{in}<0.98$. This is because when $L_{out}/L_{in}$ is smaller than 0.75, $L_{out}$ is insufficient, so that the widthwise outermost carcass layer 3 is broken earlier than the widthwise innermost carcass layer 3, which would make it impossible to utilize the ability of the whole carcass 4 to the maximum. On the other hand, when $L_{out}/L_{in}$ is larger than 0.98, as with a conventional carcass 4, $L_{out}$ is not small enough, so that the widthwise innermost carcass layer 3 is broken earlier than the widthwise outermost carcass layer 3, which would make it impossible to utilize the ability of the whole carcass 4 to the maximum.

Furthermore, elongation at break $M_{in}$ of cords constituting the widthwise innermost carcass layer 3 of the carcass 4 and elongation at break $M_{out}$ of cords constituting the widthwise outermost carcass layer 3 preferably satisfy $0.75<M_{out}/M_{in}<0.98$. This is because when $M_{out}/M_{in}$ is smaller than 0.75, $M_{out}$ is insufficient, so that the cords constituting the widthwise outermost carcass layer 3 are broken earlier than the cords constituting the widthwise innermost carcass layer 3, which would make it impossible to utilize the ability of the whole carcass 4 to the maximum. On the other hand, when $M_{out}/M_{in}$ is larger than 0.98, as with a conventional carcass 4, $M_{out}$ is not small enough, so that the cords constituting the widthwise innermost carcass layer 3 are broken earlier than the cords constituting the widthwise outermost carcass layer 3, which would make it impossible to utilize the ability of the whole carcass 4 to the maximum.

In addition, with respect to the carcass 4, it is preferable that cords are stacked to intersect with each other between two or more carcass layers composed of cords coated with rubber, and the inclination angle of the cords constituting the widthwise outer carcass layer 3 with respect to the tire width direction is not more than the inclination angle of the cords constituting the widthwise inner carcass layer 3 with respect to the tire width direction among respective radially adjacent carcass layers.

That is to say, the inclination angle of the cords constituting a widthwise outer carcass layer 3 with respect to the tire width direction is made less than the inclination angle of the cords constituting a widthwise inner carcass layer 3 with respect to the tire width direction, which allow elongation at break in the tire width direction to decrease from a widthwise inner carcass layer 3 to a widthwise outer carcass layer 3. Further, the cords constituting the widthwise inner and outer carcass layers 3 can be broken at the same time when the tire 9 is broken by high internal pressure. Consequently, ability of the cords can be further utilized. On this occasion, it is preferable that the inclination angle of the cords with respect to the tire width direction is within a range of 0 degrees to 45 degrees. This is because if the angle exceeds 45 degrees, the carcass 4 is relatively reduced in stiffness in the width direction and cannot sufficiently serve as a member supporting water pressure in the water pressure test to be described below.

Figure 5:
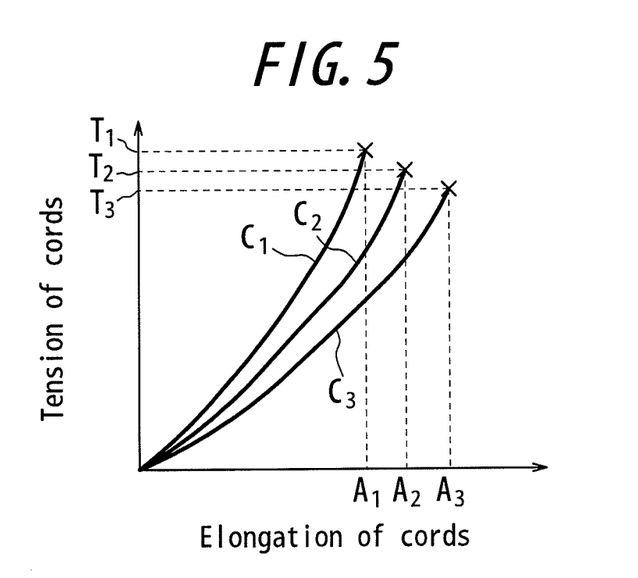
FIG. 5 is a view showing a relationship between the number of twist turns of cords and the tension and the elongation ratio of the twisted cords.

In addition, it is preferable that with respect to adjacent carcass layers, the number of twist turns of the cords constituting a widthwise outer carcass layer 3 is less than the number of twist turns of the cords constituting a widthwise inner carcass layer 3. In general, as shown in FIG. 5, when the number of twist turns of cords is decreased ($C_3>C_2>C_1$), as elongation at break of the cords is decreased ($A_3>A_2>A_1$), tension of the cords tends to be increased ($T_3<T_2<T_1$). That is to say, cords having the number of twist turns of less than that of cords constituting a widthwise inner carcass layer 3 are applied to a widthwise outer carcass layer 3, which can increase cord tension and decrease elongation at break of the widthwise outermost carcass layer 3. It is noted that the above-mentioned number of twist turns refers to the number of upper twist turns.

It is preferable to select appropriate organic fiber cords for cords constituting the carcass layers 3 depending on desired weight, stiffness, and the like. Flexibility and strength required for the cords vary depending on the kinds of aircrafts or tire structures. For example, rayon cords, aramid (aromatic polyamide) cords, or the like are preferably used for the organic fiber cord. The size of the cords can be naturally changed as appropriate depending on the kind of rubber forming the tire, and stiffness and cross-sectional shapes of bead cores 10.

Further, spacing distance between adjacent carcass layers 3 in the carcass 4 is preferably larger toward the widthwise outer side from the widthwise inner side. This is because when spacing distance between adjacent carcass layers 3 on the widthwise outer side is large, the carcass 4 is larger in thickness on the widthwise outer side, and energy is required for deformation of a tire when the tire rotates with load applied thereto, which allows the elongation at break to decrease. On this occasion, in terms of further increasing the thickness of the carcass 4 and reducing elongation at break thereof, the carcass layers 3 are preferably three layers or more. Further, in terms of restraining change in spacing distance between each carcass layer 3 in the carcass 4 from causing excessive stiffness differences and improving durability of the tire; preferably, spacing distance between each adjacent carcass layer 3 is progressively longer toward the widthwise outer side from the widthwise inner side.

EXAMPLE

Aircraft tires having a size of 46×17820 (30PR) were produced under various specifications shown in Table 1. Each tire was mounted on a normal rim based on a "Year Book" of TRA (The Tire And Rim Association, inc.) in the United States of America to obtain tire wheels, and weight and pressure resistance of each tire wheel were examined. Pressure resistance of the tire was examined as a factor of safety (pressure at break). The results are shown in Table 1.

Pressure resistance of each tire was evaluated by examining a factor of safety (pressure at break). The factor of safety (pressure at break) was surveyed by the water pressure test, in which the inside of a tire was filled with water and its water pressure was gradually increased up to the timing when the tire was broken. The measured value shows the ratio of the water pressure at the time of tire breakage to the specified internal pressure. The higher the value is, the tire pressure resistance is more excellent. It is defined in TSO-c62e of "TSO (Technical Standard Order)" which is an official standard of FAA (Federal Aviation Administration) in the United States of America that a practical tire must successfully withstand for 3 seconds without bursting in a state where the tire is filled with air having a pressure of four times the regular internal pressure.

As apparent from the results in Table 1, with respect to Conventional Example Tire 1, the factor of safety was effectively ensured; however, the weight was not sufficiently reduced. Further, with respect to Conventional Example Tire 2, although the weight was reduced sufficiently, the factor of safety was not effectively ensured. Meanwhile, with respect to Example Tires 1 to 6, the factor of safety (pressure at break) was effectively ensured as with Conventional Example Tire 1; the effect is particularly significant in Examples 2 to 4 and 6 in which $M_{out}/M_{in}$ was in the range of 0.80 to 0.95. On this occasion, the conditions of TSO-c62e were achieved in each of Conventional Example tire 1, Example Tires 2 to 4, and 6. Further, the weight of each of Example Tires 1 to 6 was effectively reduced as with Conventional Tire 2.

INDUSTRIAL APPLICABILITY

As clearly understood from the above description, the present invention can provide an aircraft tire with improved pressure resistance by optimizing a carcass structure which can effectively restrain increase in tire weight.

| DESCRIPTION OF REFERENCE NUMERALS | |
|---|---|
| 1: | inner liner |
| 2: | bead portion |
| 3, 3a-3c: | carcass layers |
| 4: | carcass |
| 5, 5a-5d: | belt layers |
| 6: | belt |
| 7: | belt protecting layer |
| 8: | tread |
| 9: | tire |
| 10: | bead cores |

TABLE 1

| | | Conventional Example Tire 1 | Conventional Example Tire 2 | Example Tire 1 | | Example Tire 2 | | Example Tire 3 | | Example Tire 4 | | Example Tire 5 | | Example Tire 6 | |
|---|---|---|---|---|---|---|---|---|---|---|---|---|---|---|---|
| Carcass | Material | Nylon | Nylon | Nylon | | Nylon | | Nylon | | Nylon | | Nylon | | Nylon | |
| | Cords | 1400dtex /2//2 | 1400dtex /2//2 | 1400dtex /2//2 | | 1400dtex /2//2 | | 1400dtex /2//2 | | 1400dtex /2//2 | | 1400dtex /2//2 | | 1400dtex /2//2 | |
| | Layer number | 6 layers | 5 layers | 5 layers | | 5 layers | | 5 layers | | 5 layers | | 5 layers | | 5 layers | |
| | Carcass No.*[1] | 1-6 | 1-5 | 1-3 | 4, 5 | 1-3 | 4, 5 | 1-3 | 4, 5 | 1-3 | 4, 5 | 1-3 | 4, 5 | 1-3 | 4, 5 |
| | Angle (degrees)*[4] | 0 | 0 | 0 | 0 | 0 | 0 | 0 | 0 | 0 | 0 | 0 | 0 | 0 | 10 |
| | Twist turns (index) | 100 | 100 | 100 | 63 | 100 | 77 | 100 | 80 | 100 | 90 | 100 | 95 | 100 | 80 |
| | Cord strength (index) | 100 | 100 | 100 | 125 | 100 | 121 | 100 | 114 | 100 | 105 | 100 | 102 | 100 | 114 |
| | Elongation at break of cords (%) | 20.4 | 20.4 | 20.4 | 15.1 | 20.4 | 16.1 | 20.4 | 17.2 | 20.4 | 19.3 | 20.4 | 20 | 20.4 | 17.2 |
| | Elongation at break of carcass layer (%) | 20 | 20 | 20 | 15 | 20 | 16 | 20 | 17 | 20 | 19 | 20 | 19.6 | 20 | 17 |
| | $L_{out}$ | 20 | 20 | 15 | | 16 | | 17 | | 19 | | 19.6 | | 17 | |
| | $L_{in}$ | 20 | 20 | 20 | | 20 | | 20 | | 20 | | 20 | | 20 | |
| | $L_{out}/L_{in}$ | 1 | 1 | 0.75 | | 0.8 | | 0.85 | | 0.95 | | 0.98 | | 0.85 | |
| | $M_{out}$ | 20.4 | 20.4 | 15.2 | | 16.3 | | 17.2 | | 19.3 | | 19.9 | | 17.2 | |
| | $M_{in}$ | 20.4 | 20.4 | 20.4 | | 20.4 | | 20.4 | | 20.4 | | 20.4 | | 20.4 | |
| | $M_{out}/M_{in}$ | 1 | 1 | 0.75 | | 0.8 | | 0.84 | | 0.94 | | 0.98 | | 0.85 | |
| Performance | Weight (index)*[5] | 100 | 96 | 96 | | 96 | | 96 | | 96 | | 96 | | 96 | |
| | Factor of safety (pressure at break)*[6] | 4.6 | 3.8 | 3.9 | | 4.3 | | 4.4 | | 4.2 | | 3.9 | | 4.4 | |

*[1]The first carcass, the second carcass.,,, sequentially from the radially inner side of the carcass.
*[2]Inclination angle of cords with respect to the tire width direction.
*[3]The upper twist multiplier of the cords of Conventional Example Tire 1 is defined as 100.
*[4]The cord strength (index) of the cords of Conventional Example Tire 1 is defined as 100.
*[5]The tire weight (index) of Example Tire 2 is defined as 100.
*[6]The tire is mounted on a rim and the inside of the tire is filled with water to increase the pressure therein.
The ratio of the water pressure at the time of tire breakage to the regular internal pressure.
The ratio is at least 4 in the official standard.

The invention claimed is:

1. An aircraft tire comprising:
   a pair of bead portions; and
   a carcass made by stacking three or more carcass layers composed of cords coated with rubber,
   wherein the carcass serves as a framework,
   the carcass layers toroidally extend between the bead portions, and
   with respect to carcass layers of the carcass which are adjacent to each other, elongation at break of a widthwise outer carcass layer is smaller than elongation at break of a widthwise inner carcass layer,
   wherein spacing distance between each of adjacent carcass layers in the carcass increases toward a widthwise outer side from a widthwise inner side.

2. The aircraft tire according to claim 1, wherein elongation at break $L_{out}$ of a widthwise outermost carcass layer of the carcass and elongation at break $L_{in}$ of a widthwise innermost carcass layer satisfy $0.75 < L_{out}/L_{in} < 0.98$.

3. The aircraft tire according to claim 1, wherein elongation at break $M_{in}$ of cords constituting the widthwise innermost carcass layer of the carcass and elongation at break $M_{out}$ of cords constituting the widthwise outermost carcass layer satisfy $0.75 < M_{out}/M_{in} < 0.98$.

4. The aircraft tire according to claim 1,
   wherein, between two or more carcass layers composed of cords coated with rubber in the carcass, cords are stacked to intersect with each other, and
   with respect to adjacent carcass layers, an inclination angle of cords constituting a widthwise outer carcass layer with respect to a tire width direction is smaller than an inclination angle of cords constituting a widthwise inner carcass layer with respect to the tire width direction.

5. The aircraft tire according to claim 1, wherein, with respect to the adjacent carcass layers, twist turns of cords constituting the widthwise outer carcass layer is equal to or less than twist turns of cords constituting the widthwise inner carcass layer.

6. The aircraft tire according to claim 1, wherein the cords constituting the carcass layer are organic fiber cords.

7. The aircraft tire according to claim 1, wherein the spacing distance between the adjacent carcass layers progressively increases toward the widthwise outer side from the widthwise inner side.

* * * * *